US011880802B2

(12) United States Patent
Pauline

(10) Patent No.: US 11,880,802 B2
(45) Date of Patent: *Jan. 23, 2024

(54) GARMENT LIFE CYCLE TRACKING SYSTEM AND METHOD

(71) Applicant: Eco Culture Manufacturing Corp., Las Vegas, NV (US)

(72) Inventor: WiNima Pauline, Las Vegas, NV (US)

(73) Assignee: ECM TEXTILE PLASTICS & RECAPTURE, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,476

(22) Filed: Oct. 17, 2022

(65) Prior Publication Data

US 2023/0036944 A1 Feb. 2, 2023

Related U.S. Application Data

(63) Continuation of application No. 16/408,726, filed on May 10, 2019, now Pat. No. 11,481,721, which is a
(Continued)

(51) Int. Cl.
*G06Q 30/00* (2023.01)
*G06Q 10/083* (2023.01)
(Continued)

(52) U.S. Cl.
CPC ......... *G06Q 10/0838* (2013.01); *A41D 1/002* (2013.01); *G06F 16/90335* (2019.01);
(Continued)

(58) Field of Classification Search
None
See application file for complete search history.

(56) References Cited

U.S. PATENT DOCUMENTS 5,906,004 A 5/1999 Lebby et al.
7,598,869 B2 10/2009 Kumagai et al.
(Continued)

FOREIGN PATENT DOCUMENTS

KR 20100066655 A * 6/2010 ........... G06K 19/027

OTHER PUBLICATIONS

Anonymous; "Fujitsu Begins Worldwide Sales of UHF-Band RFID Tags for Garment Management"; May 12, 2008; JCN Newswire (Year: 2008).*

*Primary Examiner* — Michelle T Kringen
*Assistant Examiner* — Norman Donald Sutch, Jr.
(74) *Attorney, Agent, or Firm* — Invention To Patent Services; Alex Hobson

(57) ABSTRACT

A garment life cycle tracking system utilizes a Radio Frequency Identification, RFID, device to retrieve life cycle data about the garment. The RFID device may be scanned by an interactive device, such as a mobile phone, and the RFID identifier may be used to retrieve data from a database, such as through a website interface. A mobile phone or other computing device may have an application software that interfaces with the database or website. Life cycle data may include date of manufacture, former locations of purchase, date of purchase, cost of garment, date of return of garment, type of garment and the like. A customer may track a garment after returning a garment to see when and where the garment is subsequently purchased. This system may promote recycling of garments and reduce the environmental impact of garment production.

15 Claims, 6 Drawing Sheets

Related U.S. Application Data continuation-in-part of application No. PCT/US2017/061081, filed on Nov. 10, 2017.

(60) Provisional application No. 62/420,046, filed on Nov. 10, 2016.

(51) Int. Cl.

| | | |
|---|---|---|
| *G06F 16/903* | (2019.01) | |
| *A41D 1/00* | (2018.01) | |
| *G06K 19/02* | (2006.01) | |
| *G06K 19/07* | (2006.01) | |
| *G06Q 10/30* | (2023.01) | |
| *G06Q 10/0833* | (2023.01) | |
| *G06Q 10/087* | (2023.01) | |
| *G06Q 30/0601* | (2023.01) | |

(52) U.S. Cl.
CPC ....... *G06K 19/027* (2013.01); *G06K 19/0725* (2013.01); *G06Q 10/087* (2013.01); *G06Q 10/0833* (2013.01); *G06Q 10/30* (2013.01); *G06Q 30/0623* (2013.01)

(56) References Cited

U.S. PATENT DOCUMENTS

| | | | |
|---|---|---|---|
| 7,931,197 | B2 | 4/2011 | Brandt et al. |
| 8,371,501 | B1* | 2/2013 | Hopkins ............. H04L 63/0861 |
| | | | 235/382 |
| 8,593,256 | B2 | 11/2013 | Isabell |
| 8,936,197 | B2 | 1/2015 | Tiedmann et al. |
| 9,064,199 | B2 | 6/2015 | Nitta |
| 9,336,476 | B1 | 5/2016 | Liu et al. |
| 2002/0038267 | A1 | 3/2002 | Can et al. |
| 2005/0093698 | A1* | 5/2005 | Sakamoto ........ G06K 19/07758 |
| | | | 705/28 |
| 2005/0102876 | A1 | 5/2005 | Kelly |
| 2005/0114270 | A1 | 5/2005 | Hind |
| 2006/0187046 | A1 | 8/2006 | Kramer |
| 2007/0199988 | A1 | 8/2007 | Labgold |
| 2009/0058615 | A1 | 3/2009 | Schultz |
| 2009/0100575 | A1* | 4/2009 | Darnborough ....... G06K 19/027 |
| | | | 2/244 |
| 2010/0050487 | A1 | 3/2010 | Weightman et al. |
| 2012/0164405 | A1 | 6/2012 | Webb et al. |
| 2012/0251432 | A1* | 10/2012 | Cooper ................... C23C 16/50 |
| | | | 977/750 |
| 2014/0209690 | A1 | 7/2014 | Teng et al. |
| 2016/0316317 | A1* | 10/2016 | Mayiras ............. H04W 52/283 |
| 2017/0053293 | A1* | 2/2017 | Choi ...................... G06Q 30/02 |

\* cited by examiner

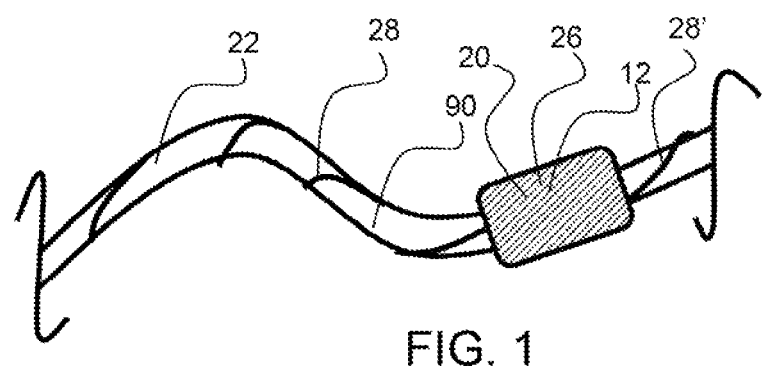
FIG. 1
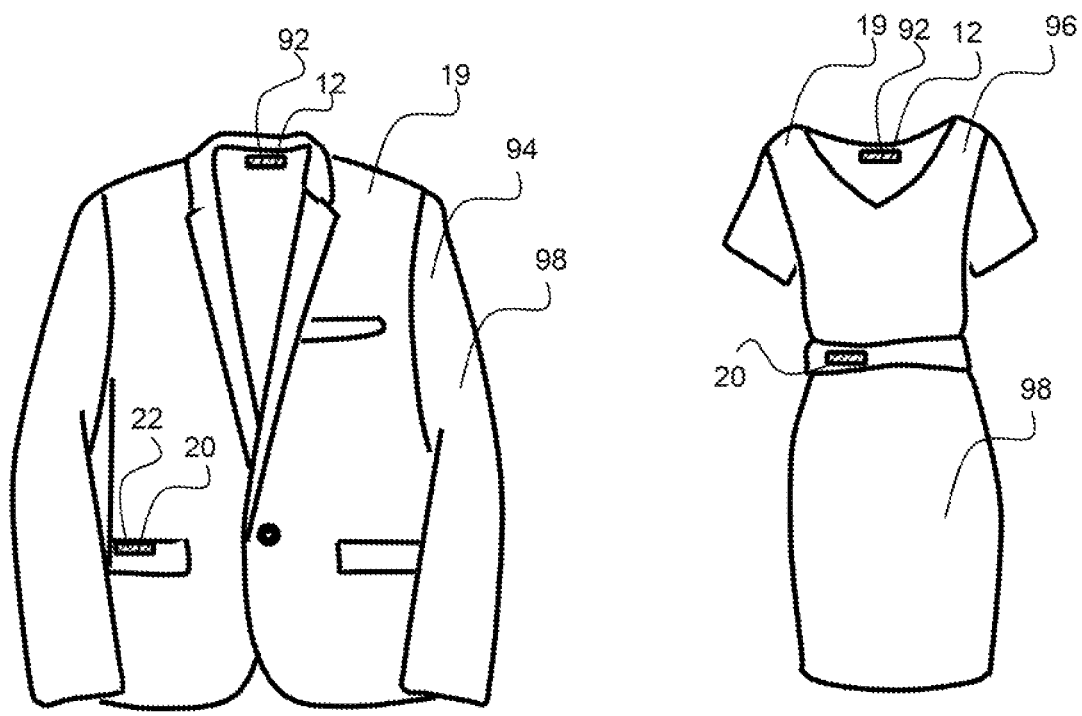
FIG. 2
FIG. 3

GARMENT LIFE CYCLE TRACKING SYSTEM AND METHOD

CROSS REFERENCE TO RELATED APPLICATIONS

This application is a continuation of U.S. patent application Ser. No. 16/408,726, filed on May 10, 20219 and currently pending, which is a continuation in part of PCT application No. PCT/US2017/061081, having an international filing date of Nov. 10, 2017, which claims the benefit of priority to U.S. provisional patent application No. 62/420,046, filed on Nov. 10, 2016 and entitled Garment Life Cycle Tracking System and Method; the entirety of all prior applications are hereby incorporated by reference herein.

BACKGROUND OF THE INVENTION

Field of the Invention

The invention relates to a garment life cycle tracking system that incorporates a radio frequency identification, RFID, device.

Background

There is a growing portion of consumer that are interested in sustainable products and purchasing products that have a reduce impact on the environment. Products, or portions thereof, can be recycled and/or recirculated in an effort to reduce environment impact. Some products taught that they are made from recycle materials, or made in part with recycled materials. There are many second-hand garment franchises and they are growing in popularity, especially for higher end garments, such as dresses, suits and the like. Conscientious consumers may want to know the history, or life cycle, of a garment before making a purchase. In addition, consumers may want to be rewarded for returning garments that can be resold recycled, such as by receiving discounts or points toward the purchase of another garment.

SUMMARY OF THE INVENTION

The invention is directed to a garment life cycle tracking system that incorporates a radio frequency identification, RFID, device. An exemplary life cycle tracking system may incorporate a RFID device that is attached to the garment, such as to a tag of the garment, or coupled to the fabric, such as to a yarn or thread, E-thread, of the garment. An interactive device, such a mobile telephone, may be used to read the RFID identifier from the RFID device and then interact with a database to retrieve information about the garment. Some life cycle data may be stored directly on the RFID device, but in a preferred embodiment, at least some of the life cycle data, or life cycle information, regarding the garment is retrieve from a database using an identifier read from the RFID device. In one embodiment, the RFID identifier is a garment identifier, wherein the RFID identifier is correlated to a particular individual garment. A customer may scan a garment to determine the life cycle of the garment, such as when it was manufactured, type of garment, size of garment, when it was first purchases, purchase price of the garment, when it was first returned, location of purchase, location of return, date of second purchase, type of garment, pricing information and the like. A user may purchase a garment having a RFID device and the information of the purchase may be added to the database. When the customer returns the garment, they may receive a discount, points, or a credit towards the purchase of another garment. When the garment is returned, the date of return, the location of return and/or the duration of ownership may be added to the database of information regarding that garment. A customer may use a mobile telephone and in some cases an application software on their mobile telephone to interface with the database having the information about the garments. This exemplary garment life cycle tracking system provides a customer with valuable information that may make them more likely to purchase and return garments for recycling in an effort to reduce environmental impacts.

A RFID device may be configured into a garment, such as into a tag or more preferably into the fabric of the garment itself, wherein removal and tampering are less likely. A RFID device may be a micro RFID device and may be configured as an E-Thread, a yarn or thread that has a RFID device incorporated therein. The E-Thread may be woven directly into the textile fabric that is used to make a garment. For example, an E-Thread is available from Primo 1D, France, that incorporates an EPC ultrahigh frequency (UHF) RFID chip that is connected to antennas that extend from either side of the chip and are also integrated into the thread. The RFID device, or the body portion of a RFID device may be very small wherein the dimensions are less than 1000 micron, such as no more than 800 by 800 microns, and more preferably no more than 500 by 500 microns, and even more preferably no more than 400 by 400 microns and any range between and including the dimensions provided. It is to be understood that a micro RFID device may have one or more antennas that extend from the body portion. For example, they may extend from opposing sides of the body portion and may be woven into a thread, yarn or fabric. These antennas may have a length on the order of about 10 mm or more, about 25 mm or more, about 50 mm or more, about 100 mm or more and any range between and including the antenna lengths provided. The thread or yarn that a micro RFID device is incorporated into may be synthetic, natural fiber or some combination of thereof. A RFID device can be read from a distance of about 15 meters or less, or about 8 meters or less, or about 7 meters or less, thereby enabling reading of a RFID on a garment by being close and not necessarily requiring a person to locate the RFID device. As described herein, locating an E-thread or a micro RFID device in a garment would be very difficult.

In an exemplary embodiment, a RFID device is configured within a thread, such as between twist of yarn and is therefore covered at least partially by the individual yarns. In an exemplary embodiment, the RFID device is completely covered by the yarns and is protected from exposure to the elements and to water when washing the garment. An exemplary thread may comprise micro or nano yarns such as nanotubes of carbon for example. An RFID device may be configured between micro or nano sized yarns and a hydrophobic coating, may be applied to the yarns or thread to further prevent water exposure to the RFID device. A hydrophobic coating may comprise a hydrophobic polymer such as a fluoropolymer, silicone or urethane, for example. The surface energy of a hydrophobic coating may be less than about 40 dynes/cm, preferably less than about 30 dynes/cm, and more preferably less than 25 dynes/cm, and most preferably less than 20 dynes/cm and any range between and including the surface energy values provided. Many fluoropolymers, such as polytetrafluoroethylene have surface energy values less than 20 dynes/cm, such as about 18 dynes/cm and even 15 dynes/cm or less.

Carbon nanotubes, as defined herein, may be made up entirely of carbon and may be a single wall or multiwall tube. A multi-walled carbon nanotube consists of multiple layers of graphite superimposed and rolled in on themselves to form a tubular shape. The structure of a carbon nanotube is formed by a layer of carbon atoms that are bonded together in a hexagonal (honeycomb) mesh. This one-atom thick layer of carbon is called graphene, and it is wrapped in the shape of a cylinder and bonded together to form a carbon nanotube. Nanotubes can have a single outer wall of carbon, or they can be made of multiple walls (cylinders inside other cylinders of carbon). Carbon nanotubes have a range of electric, thermal, and structural properties that can change based on the physical design of the nanotube. Carbon nanotubes are very strong as well as being electrically and thermally conductive. A multi-walled carbon nanotube may be 15 to 20 stronger than steel while being 5 times lighter. Carbon nanotubes are also exceptional electron filed-emitters due to their high length to diameter ratio and electrical conductivity. The antenna of the RFID device may be coupled to or may be part of the carbon nanotube, thereby improving the performance and range of signal transmission of the RFID device.

In an exemplary embodiment, a RFID device is configured within a cavity of a yarn, such as a hollow yarn or yarn that is a tube, having an outer wall and an inner cavity. A garment or tag of a garment may comprise a hollow yarn and this yarn may be configured into a thread that is part of the garment. The RFID device may be a micro RFID device and may be configured within the cavity of the yarn and thereby be protected from exposure to the elements. The hollow yarn may have closed or sealed ends to prevent the ingress of water and other liquids into the cavity of the hollow yarn. The yarn may be water resistant or preferably waterproof to prevent water from passing through the wall of the hollow yarn and into the cavity. An exemplary hollow yarn may be a carbon tube or may be made out of a polymer, such as a polyethylene or polypropylene, for example. The yarn may be part of a thread that is woven into the garment or into a tag of the garment.

An interactive device may be used to read the RFID device in the garment. An interactive device may be an electronic reader or scanner, or more preferably the interactive device is a mobile telephone or portable computing device that is configured to read RFID devices. These electronic devices are ubiquitous in society and would provide a customer an easy way to track and log information about a garment they purchased. For example, a customer may purchase a garment from a garment provider or retailer and upon purchase they may be given a login code that allows them to read the RFID tag on the garment they purchased. This garment identification may then be kept in their system to track future purchases and life cycle data after they have returned the garment. In another embodiment, a customer may use a mobile device to read RFID tags on garments for sale by the garment provider and this information may have some weight on what garment they purchase.

When a RFID tag of a garment is read by an interactive device, the interactive device, such as a mobile telephone, may interface with a database to retrieve the life cycle data. The mobile telephone may have an application software that enables the RFID tag identifier to be provided for downloading the life cycle data. A website may interface with the interactive device and the database to manage the exchange of information between the interactive device and the database. A website and/or application software may be provided by a garment provider such a company that sells garments or a particular brand of garments, ie, Ralph Lauren of Polo.

Life cycle data may include dates and locations of purchase and/or return of garments, date and/or location of manufacture of the garment, number of owners of the garment, ownership period or duration, type of garment, purchase price of the garment and the like. A geographical map may be used to display life cycle data, wherein the place of purchase is shown on the geographical map. In this way, a customer can appreciate the various places and durations of ownership of the garment.

When a customer returns a RFID garment, they may return it to a point of sale, such as a store location, or retailer, or they may return the garment by mail to a central location, or recycle location. A recycle location may receive recycled garments for the purposes of evaluating and inspecting the garment. They may clean, repair and repackage the garment for sale. The recycle location may then send the garment to a store location and/or post the garment on-line, or with an online retailer, for purchase. In an exemplary embodiment, a returned garment is deconstructed and at least a portion of the fabric of the returned garment is used to make a new garment. The new garment may be a different type of garment from the returned garment and this information may be part of the life cycle data that can be retrieved by a customer. For example, a dress may be returned and due to a stain on the dress, it is deconstructed and the unstained portion of the fabric is use to make a skirt.

This unique garment life cycle tracking system enables a unique method of tracking a garment life cycle. In this method, a garment provider, such as store or retailer, or online retailer, provides a garment having a RFID device coupled thereto. As described herein, it is preferred that the RFID device be a micro RFID device and/or an E-thread, so that the RFID device will not be tampered with. A customer may purchase the garment and use an interactive device, such as a mobile telephone, to read the RFID device and retrieve life cycle data about the garment. As described herein, an interactive device, may utilize an application software to interface with the database, such as through a website, to retrieve the life cycle data. In an exemplary embodiment, the application software is only activated after purchase of a garment, thereby enabling on customer of the recycled garments to retrieve life cycle data. In still another embodiment, the RFID identifier for the specific garment or garments purchased are made active for retrieval of the life cycle data. A special code may be provided to the customer at the time of purchase that activates download of life cycle data for the RFID identifier in the garment or garments purchased. In this way, a customer can only track garments that they have purchased and no other customer's garment(s).

An interactive device may be a computing device such as a computer, a mobile telephone, a laptop computer, a tablet computer, or a scanner or reader that may be coupled to a computing device.

A garment, as used herein may be any suitable type of garment including, but not limited to, pants, shirt, jacket, coat, sports coat, suit, shoes, hat, vest, socks, dress, skirt, boots, scarf and the like.

A garment as described herein may help to reduce land fill waste whereby the garment may be identified in the trash before being added to the land fill. Waste facilities may scan trash prior to it being deposited in the land fill and remove garments, inspect them and recycle them when possible.

A garment, as described herein, and the garment life cycle tracking system may reduce the overall carbon footprint for garment production as the garments may be recycled and reused more often, thereby reducing the need for purchasing new garments.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 1 shows an exemplary RFID device coupled to a yarn.

FIG. 2 shows an exemplary garment, a coat, having a micro RFID device attached thereto.

FIG. 3 shows an exemplary garment, a dress, having a micro RFID device attached thereto.

DETAILED DESCRIPTION OF THE ILLUSTRATED EMBODIMENTS

Figure 4:
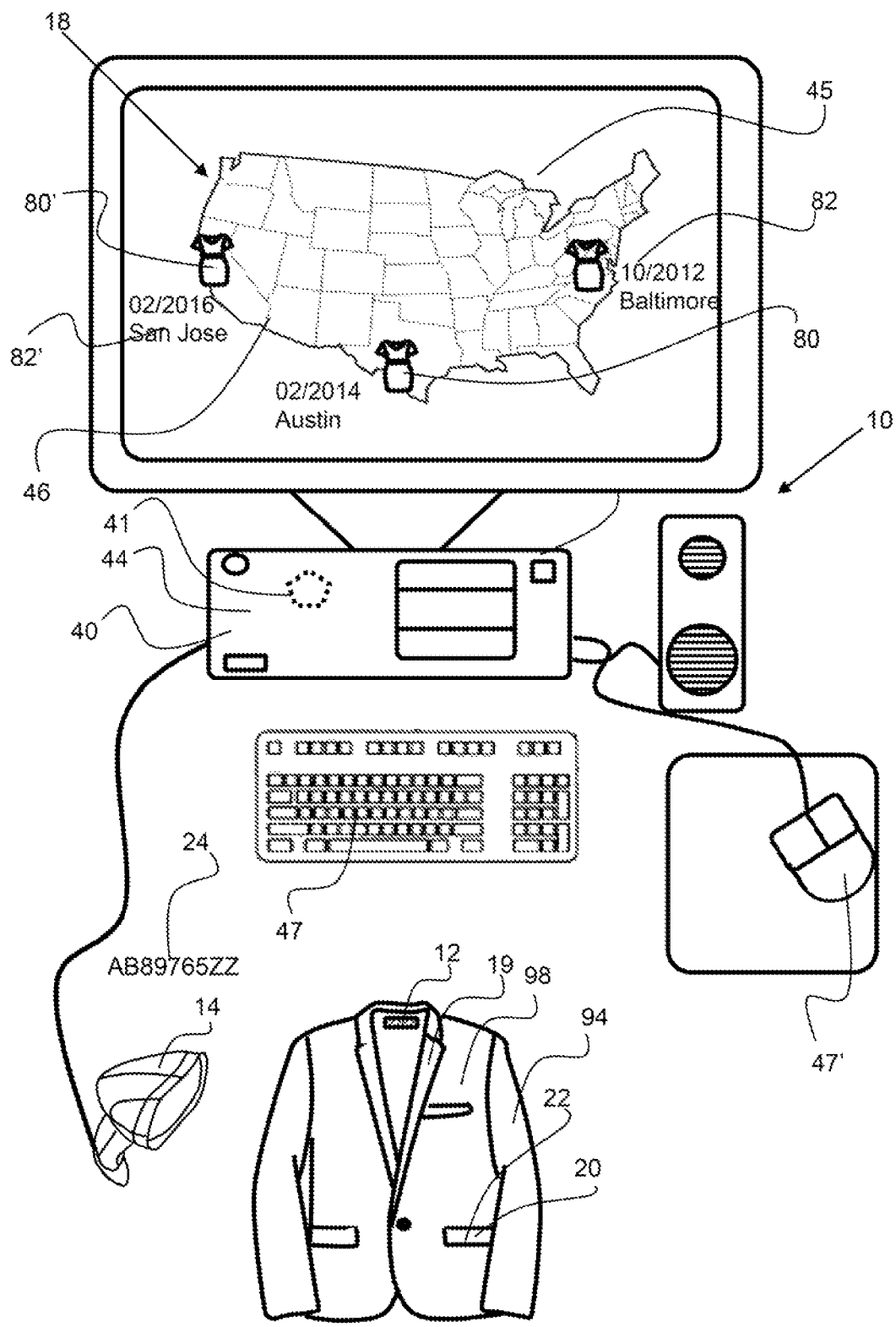
FIG. 4 shows an exemplary garment life cycle tracking system having a RFID device in a garment, an interactive device to read the RFID device, a computing device and a display to show life cycle data related to the garment, wherein the display shows previous location of purchase of the garment.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

As shown in FIG. 1, an exemplary RFID device 12 is coupled to a thread or yarn 90 to produce an E-thread 22. The body portion 26 of the micro RFID device 20 is small enough to be woven into the thread or yarn and this E-thread can be woven into the fabric used to make garment. The micro RFID device has body portion 26 and two antennas 28, 28' that extend out from opposing sides of the body portion and are integrated into the yarn 90 or thread. The antennas may be wound with the thread or yarn or otherwise coupled to the thread or yarn. A RFID device may comprise a protective cover that extends over the device and in some cases over a portion of the thread, yarn or fabric that it is coupled to.

As shown in FIG. 2, an exemplary RFID device 12 is coupled to the garment 19, a coat 94. A micro RFID device 20 is configured as an E-thread 22 and is woven into the fabric 98 of the garment. The E-thread is shown for the purposes of representation only and it is to be understood that the E-thread would not be easily detected in the garment.

As shown in FIG. 3, an exemplary garment 19, a dress 96, has a micro RFID device 20 attached thereto. As described herein, a RFID device 12 may be coupled or woven into a garment tag 92, such as a label as shown.

As shown in FIG. 4, an exemplary garment life cycle tracking system 10 comprises a RFID device 12 in a garment 19, an interactive device 14 to read the RFID device, a computing device 40 and a display 45 to show life cycle data related to the garment. The life cycle data 18, including the location of purchase 80 and date of purchase 82 are displayed on a geographical display 46, a display of a geographical area with associated information about the garment life cycle. The interactive device is a scanner configured to read a RFID device, such as a micro RFID device 22. The interactive device is coupled with the computing device, a computer 44 that provides the life cycle data to the customer. The computer may interface with a database and use the RFID identifier 24, AB89765ZZ, to retrieve the life cycle data for that RFID device, and garment. The garment was purchased in Baltimore, MD in Oct. 2012, and subsequently purchased in Austin, TX in Feb. 2014, and finally purchased in San Jose, CA in Feb. 2016. The computer has an interface 47, 47', a keyboard and a mouse, respectively. A user may use the interface to retrieve life cycle data and to manipulate the display as desired. In addition, a computing device has a controller, such as a microprocessor 41 for receiving inputs and controlling at least some of the function of the computing device. The location of purchase of a garment may be a physical store retailer location or a delivery location when the garment is ordered through a catalog, or from an online retailer, a retailer having a website for purchasing garments.

Figure 5:
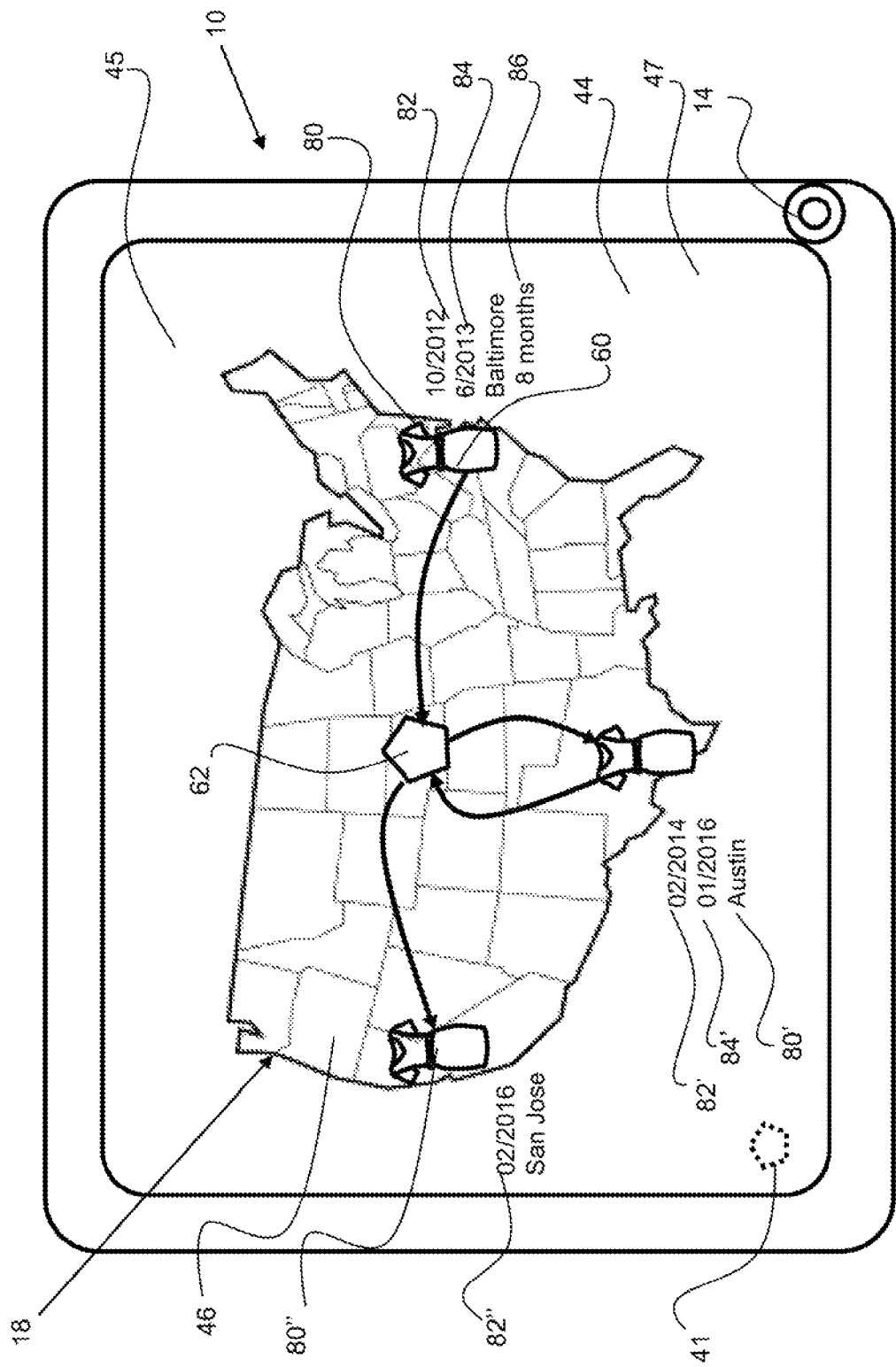
FIG. 5 shows an exemplary garment life cycle tracking system comprising a portable computer display that shows location of purchase and duration of ownership of a garment having a RFID device.

As shown in FIG. 5, an exemplary garment life cycle tracking system 10 comprises a tablet computer 44 having a display 45 that is producing a geographical display 46 of the location of purchase 80, date of purchase 82, date of return 84 and duration of ownership 86 of a garment having a RFID device. The tablet computer is configured with an interactive device 14 for reading a RFID device. The initial point of purchased 60 was Baltimore, MD, and the garment was purchased in Oct. 2012 and returned in Jun. 2013. The garment was then returned to a recycle location 62. The second point of purchase was Austin, TX in Feb. 2014 and the garment was returned in Jan. 2016. Finally, the garment was purchased in San Jose, CA in Feb. 2016. The duration of ownership may be an interesting data fact for a customer to look up about a garment that they have purchased, or are considering purchasing. The life cycle data 18 is provided in geographical display 46 having lines and arrows showing the transport of the garment from a first location to a second location. The tablet computer has a touch screen that is a user interface 47.

Figure 6:
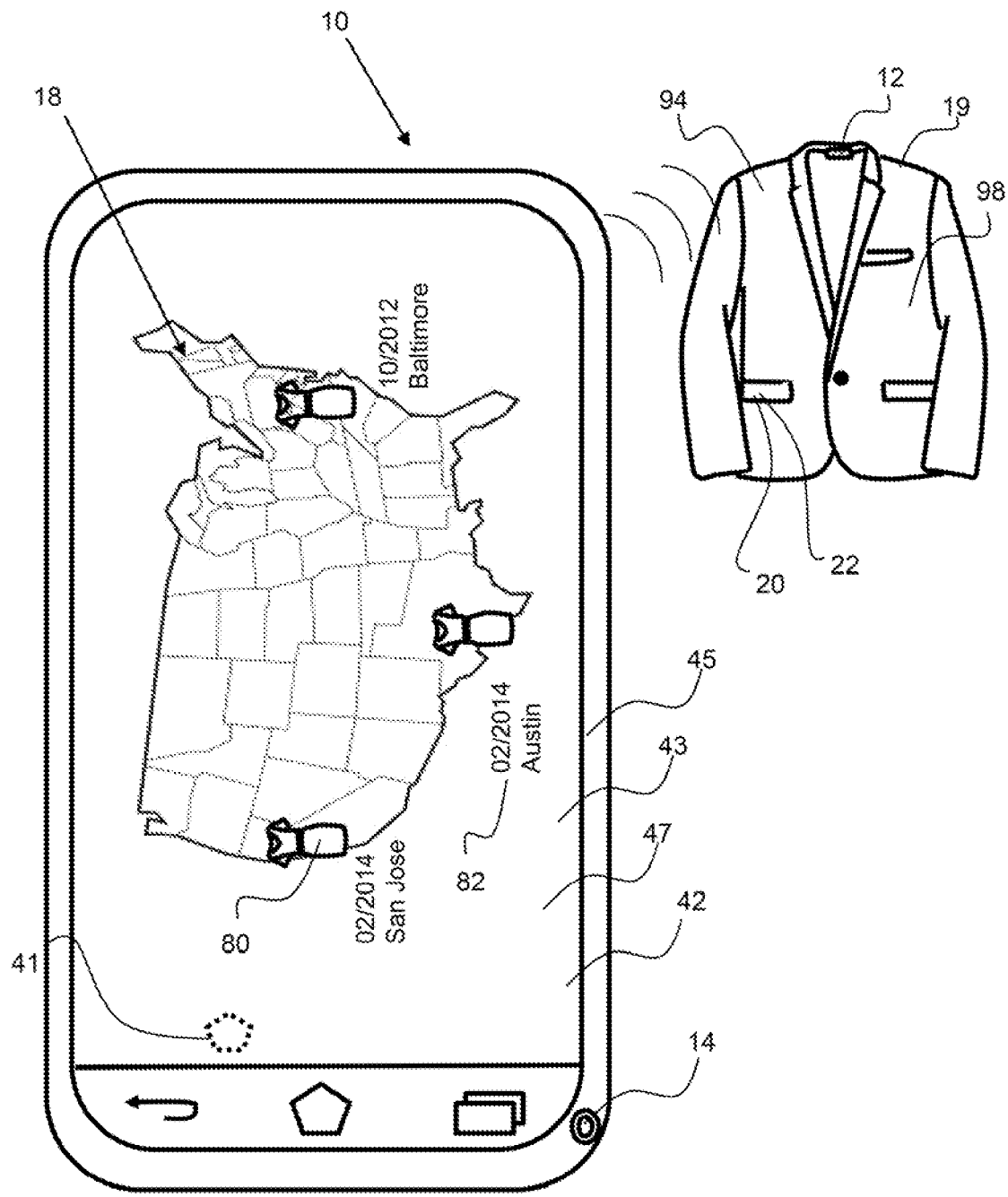
FIG. 6 shows an exemplary garment life cycle tracking system comprising a mobile telephone that has an interactive device to read the RFID device in a garment and a display to show life cycle data about the garment.

As shown in FIG. 6, an exemplary garment life cycle tracking system 10 comprises a mobile telephone 43 that has an interactive device 14 to read the RFID device 20 in a garment 19 and a display 45 to show life cycle data 18 about the garment. This mobile computing device 42 may be a convenient tool for customers to track life cycle data of a garment. A mobile telephone comprises a controller, such as a micro-processor 41 to control functions of the mobile telephone. The display provides points of purchase and dates of purchase information about the garment. The mobile telephone has a touch screen that is a user interface 47.

Figure 7:
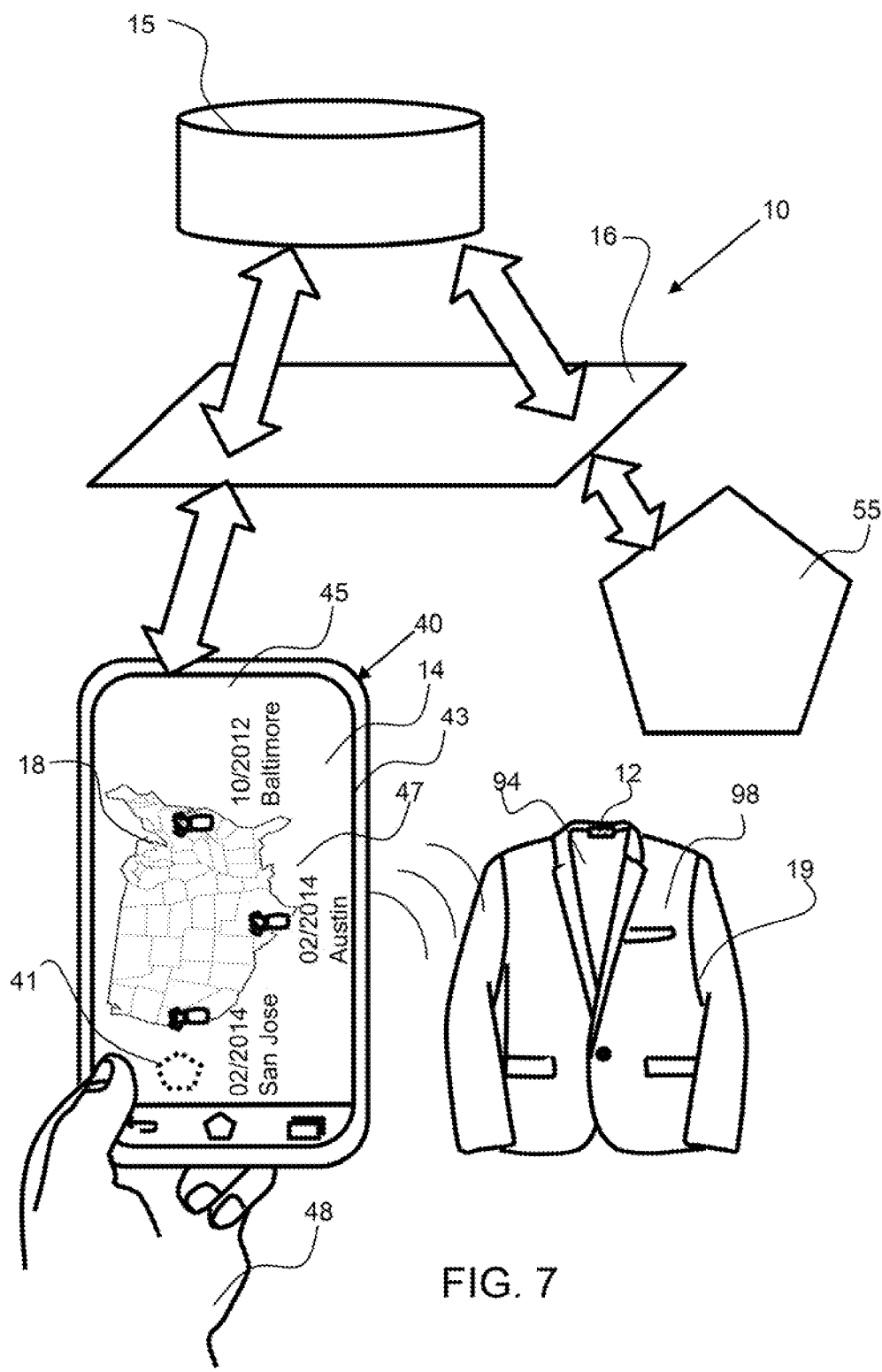
FIG. 7 shows an exemplary garment life cycle tracking system having a RFID device in a garment, an interactive device to read the RFID device, a computing device having a display to show life cycle data related to the garment, wherein the computing device interfaces with a website that interfaces with a database to relay the life cycle data about the garment.

As shown in FIG. 7, an exemplary garment life cycle tracking system 10 has a RFID device 20 in a garment 19 and an interactive device 14, a mobile telephone 43. The user or customer 48 has utilized the mobile telephone, a computing device, to read the RFID device attached to the garment. The mobile telephone has a display 45 to show life cycle data 18 related to the garment 19. The mobile telephone interfaces with a website 16 that interfaces with a database 15 to relay the life cycle data 18 about the garment. A garment provider 55 may also interface with the website and/or database to relay information about the purchase and/or return of a garment. A garment provider may be a store location, a distribution center that receives orders or an online store, for example. The mobile telephone has a touch screen that is a user interface 47.

Figure 8:
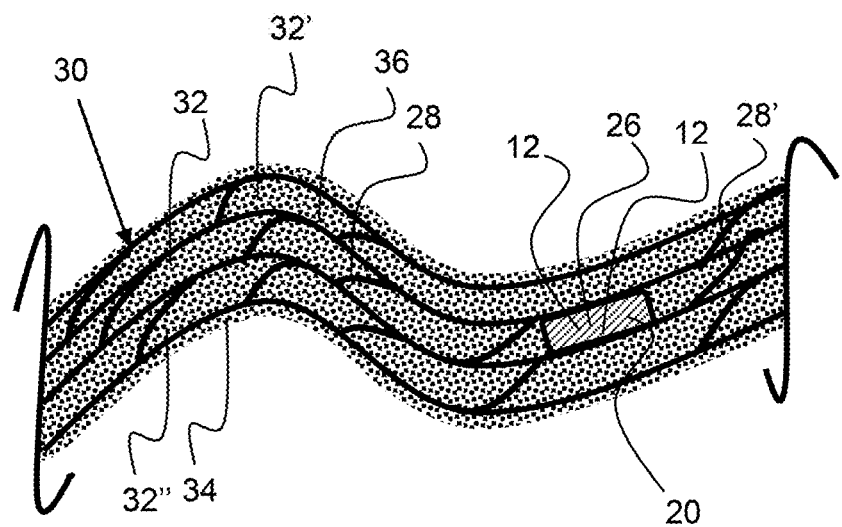
FIG. 8 shows an exemplary multiwalled thread comprising an RFID device configured between the yarns and a hydrophobic coating on the thread.

As shown in FIG. 8, an exemplary multiwalled thread 30 comprises a RFID device 12 configured between the yarns 32 of the multiwalled thread and a hydrophobic coating 34 on the thread. The RFID device may be a micro RFID device 20 having a size of less than 1000 microns. As described herein, a multiwalled thread may comprise a plurality of individual yarns and these yarns may be micro sized having a diameter of no more than 1000 microns, or nano in size having a diameter of no more than about 1000 nm, or 1 micron. An exemplary nano such as a carbon nanotube type yarn having an outer diameter of no more than about 100 nm, no more than about 80 nm, no more than about 50 nm and any range between and including the outer diameters provided. The thickness of the wall of the nanotube may be about 40 nm or less, about 60 nm or les, about 80 nm or less and any range between and including the wall thicknesses provided. An exemplary RFID device, such as a RFID microchip may be configured between the individual yarns and may be substantially covered by the outer yarns to protect the RFID device from exposure to water, for example. In an exemplary embodiment, the RFID device is completely covered by yarns and configured within the thread. The yarns may be twisted about each other to from a thread with an RFID device within the twists of the yarns. A hydrophobic coating 34, is applied to the exemplary thread to further prevent water exposure to the RFID device. A hydrophobic coating may be polymer such as a fluoropolymer, silicone, urethane and the like. This configuration of the RFID device within the interior of the thread and the application of a hydrophobic coating may enable the yarn and garment made therewith to be washed without damaging the RFID device. Note that an RFID device may be configured in a hollow yarn as well, thereby preventing exposure to the elements such as water when washing the garment.

Figure 9:
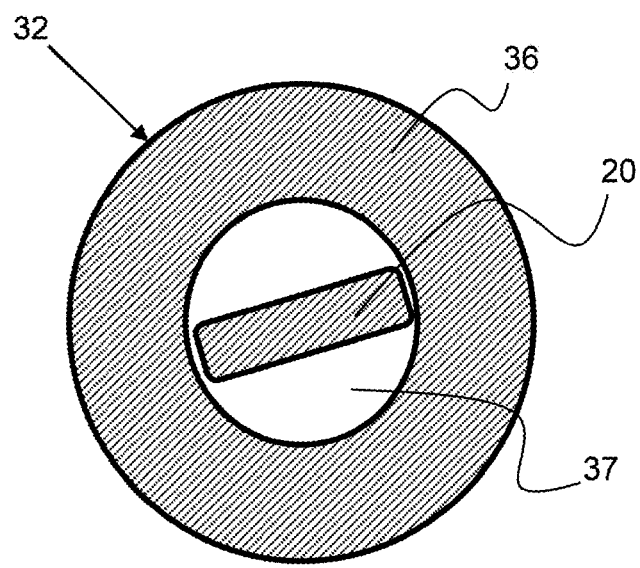
FIG. 9 shows a cross sectional view of a hollow yarn having a micro RFID device configured in the cavity of the hollow yarn.

As shown in FIG. 9, a yarn 32 may be hollow yarn 36 having a cavity 37 for retaining a micro RFID device 20. A hollow yarn may protect the RFID device from exposure to the elements. The ends of the hollow yarn may be closed to prevent the ingress of water into the cavity of the yarn. The hollow yarn may be made out of a material that is water resistant and preferably waterproof, whereby water does not penetrate through the wall of the hollow yarn. A hollow yarn may be made out of a polymer and may be a polymer film that is non-permeable, providing no flow of gas or water through the wall.

A thread is a twisted strand of two or more yarns.

An interactive device is an electronic device that is configured to read a RFID device identifier.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of tracking a garment life cycle comprising the steps of:
   a) providing a garment life cycle tracking system comprising:
      i) a garment provider for providing a garment to a customer;
      ii) said garment comprising a Radio Frequency Identification, RFID, device having a RFID identifier:
      iii) an interactive electronic device configured to read said RFID identifier from the RFID device; and
      iv) a database comprising life cycle data of said garment; wherein sad life cycle data of said garment is stored in the database;
   b) said customer purchasing said garment from said garment provider;
   c) said customer utilizing an interactive electronic device to read said RFID identifier;
   d) said interactive device retrieving said life cycle data of said garment; and
   e) said interactive device displaying to said customer the life cycle data of said garment on a display;

wherein the RFID device is a micro RFID device having a body portion;

wherein the RFID device is coupled to a thread and wherein said thread comprises a plurality of yarns and wherein the RFID device is configured between said yarns;

wherein the thread comprises a carbon nanotube having an outer diameter of no more than 1000 nm; and wherein the micro RFID device comprises said body portion and an antenna and wherein the carbon nanotube forms part of said antenna of the micro RFID device.

2. The method of tracking a garment life cycle of claim 1, wherein the garment provider is a garment retailer.

3. The method of tracking a garment life cycle of claim 1, wherein the life cycle data includes a date of receipt of a former customer.

4. The method of tracking a garment life cycle of claim 1, wherein the life cycle data includes a location of purchase of a former customer.

5. The method of tracking a garment life cycle of claim 1, wherein the life cycle data includes a date of return of said garment to said garment provider.

6. The method of tracking a garment life cycle of claim 1, further comprising the steps of said customer returning said garment to said garment provider; and said customer utilizing the garment identifier to retrieve post returned life cycle data of the garment after the step of returning said garment.

7. The method of tracking a garment life cycle of claim 6, wherein post return life cycle data includes a date of purchase of a subsequent customer.

8. The method of tracking a garment life cycle of claim 1, wherein the RFID device is coupled to a thread of said garment and wherein said thread is an E-thread.

9. The method of tracking a garment life cycle of claim 1, wherein the RFID device is configured in a garment tag.

10. The method of tracking a garment life cycle of claim 1, wherein the garment is selected from the group consisting of: pants, shirt, jacket, coat, sports coat, suit, shoe, hat, vest, sock, dress, skirt, boot and scarf.

11. The method of tracking a garment life cycle of claim 1, wherein RFID identifier includes a garment identifier.

12. The method of tracking a garment life cycle of claim 1, wherein the RFID identifier is used by the interactive device to retrieve life cycle data from the database.

13. The method of tracking a garment life cycle of claim 12, wherein the interactive device interfaces with a website that is coupled with said database for retrieving life cycle data of the garment.

14. The method of tracking a garment life cycle of claim 1, wherein the interactive device is a computer.

15. The method of tracking a garment life cycle of claim 1, wherein the interactive device is a mobile electronic device.

* * * * *